(12) United States Patent
Reybrouck et al.

(10) Patent No.: US 8,701,846 B2
(45) Date of Patent: Apr. 22, 2014

(54) INVERTED STRUT COMPRISING AN AIR DAMPER COMBINED WITH A HYDRAULIC STOP

(75) Inventors: Koen Reybrouck, Etterbeek (BE); M'Hand Nait Oukhedou, Bree (BE); Simon Anne de Molina, Marche-les-Dames (BE)

(73) Assignee: Tenneco Automotive Operating Company Inc, Lake Forest, IL (US)

( * ) Notice: Subject to any disclaimer, the term of this patent is extended or adjusted under 35 U.S.C. 154(b) by 524 days.

(21) Appl. No.: 12/547,582

(22) Filed: Aug. 26, 2009

(65) Prior Publication Data
US 2011/0048880 A1    Mar. 3, 2011

(51) Int. Cl.
*F16F 9/34* (2006.01)

(52) U.S. Cl.
USPC ............... 188/322.15; 188/276; 188/282.5; 188/284; 188/298; 188/314; 188/317; 188/319.2; 180/227; 267/34; 267/35; 267/64.15; 267/64.16; 267/124; 280/5.514; 280/201; 280/124.104; 280/124.158; 280/276

(58) Field of Classification Search
USPC ........... 188/318, 322.15, 282.1, 282.4, 282.5, 188/266.5, 322.2, 278, 276, 97, 298, 284, 188/312–313, 314–316, 322.17, 283, 188/288–289, 319.2; 267/64.26, 221, 267/64.27, 64.11, 64.13–64.14, 256, 241, 267/260, 281; 280/275–276, 283–284, 5.5, 280/6.159, 124.127
IPC .................................. B60G 17/015; F16F 9/34
See application file for complete search history.

(56) References Cited

U.S. PATENT DOCUMENTS

| | | | | |
|---|---|---|---|---|
| 2,452,885 A | * | 11/1948 | Willard | 188/315 |
| 2,774,446 A | | 12/1956 | Bourcier | |
| 3,145,985 A | * | 8/1964 | Bourcier | 267/64.16 |
| 3,171,643 A | * | 3/1965 | Roos | 267/64.15 |
| 3,351,160 A | * | 11/1967 | De Koning et al. | 188/282.5 |
| 3,391,922 A | | 7/1968 | Axthammer | |
| RE27,883 E | | 1/1974 | Vogel et al. | |
| 4,054,277 A | * | 10/1977 | Sirven | 267/35 |
| 4,061,320 A | * | 12/1977 | Warner | 267/64.15 |
| 4,159,756 A | * | 7/1979 | Murakami et al. | 188/282.5 |
| 6,412,759 B1 | | 7/2002 | Krauss | |
| 6,454,248 B2 | | 9/2002 | Pradel | |
| 6,814,347 B1 | | 11/2004 | Lemmens et al. | |
| 7,083,163 B2 | | 8/2006 | Lemmens et al. | |
| 2005/0151343 A1 | * | 7/2005 | Fujita et al. | 280/276 |
| 2005/0194197 A1 | * | 9/2005 | Fukuda et al. | 180/227 |
| 2008/0174085 A1 | * | 7/2008 | Hsu | 280/201 |

FOREIGN PATENT DOCUMENTS

| | | | |
|---|---|---|---|
| DE | 3528830 A1 | | 2/1987 |
| EP | 800939 A1 | | 10/1997 |
| JP | 2008240840 A | * | 10/2008 |
| WO | WO 9105180 A1 | | 4/1991 |

* cited by examiner

*Primary Examiner* — Robert A Siconolfi
*Assistant Examiner* — San Aung
(74) *Attorney, Agent, or Firm* — Harness, Dickey & Pierce, P.L.C.

(57) ABSTRACT

A shock absorber includes a hydraulic compression stop. The hydraulic stop includes a pressure tube surrounding the pressure tube of the shock absorber and a piston in hydraulic communication with the interior of the pressure tube. The piston can be disposed within the pressure tube and can be attached to the pressure tube or to the shock absorber. The hydraulic stop can also include a hydraulic fluid chamber and the piston can be disposed within the hydraulic fluid chamber.

22 Claims, 6 Drawing Sheets

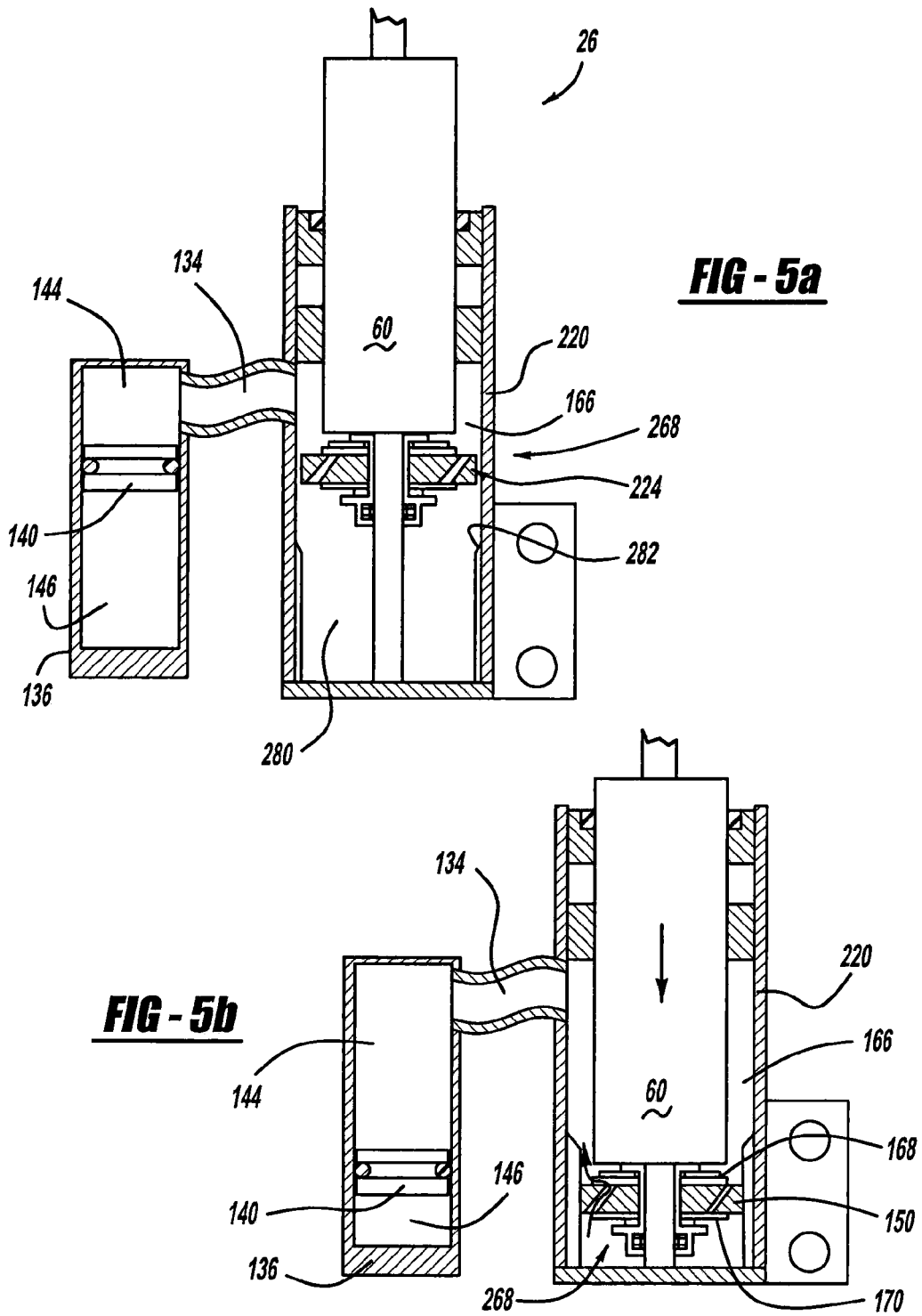

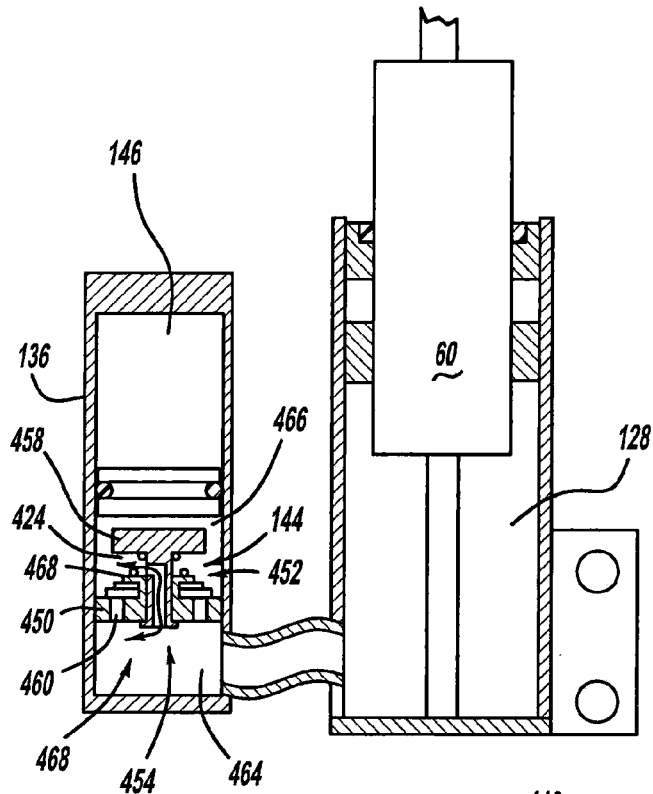
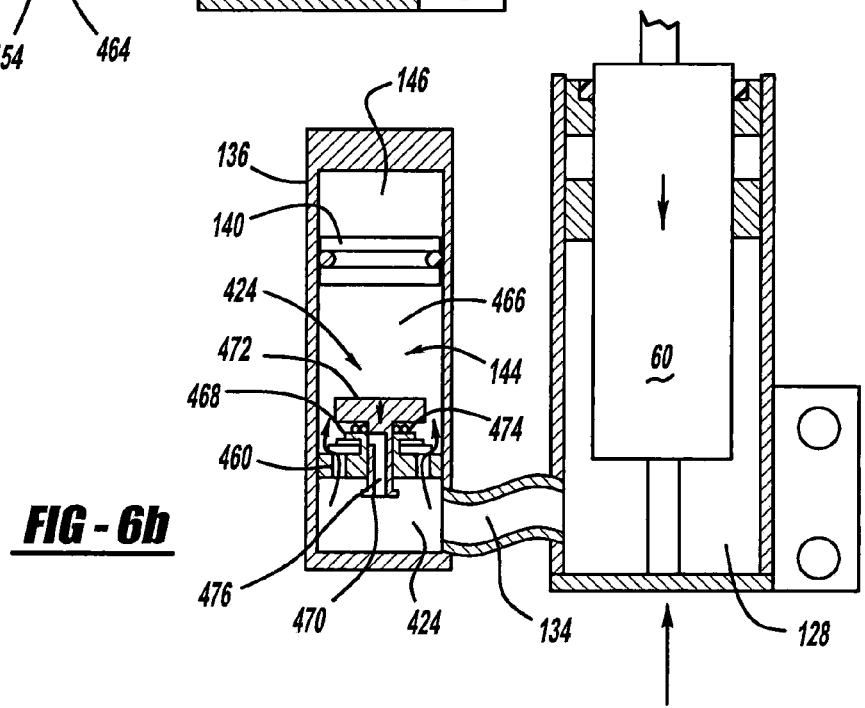
FIG - 6a
FIG - 6b

US 8,701,846 B2

INVERTED STRUT COMPRISING AN AIR DAMPER COMBINED WITH A HYDRAULIC STOP

FIELD

The present disclosure relates generally to dampers for use in a suspension system such as a suspension system used for automotive vehicles. More particularly, the present disclosure relates to an inverted pneumatic damper which is combined with a hydraulic stop.

BACKGROUND

The statements in this section merely provide background information related to the present disclosure and may not constitute prior art.

Shock absorbers are used in conjunction with automotive suspension systems and other suspension systems to absorb unwanted vibrations which occur during movement of the suspension system. In order to absorb these unwanted vibrations, automotive shock absorbers are generally connected between the sprung (body) and the unsprung (suspension/chassis) masses of the vehicle.

The most common type of shock absorbers for automobiles is the dashpot type which can be either a mono-tube design or a dual-tube design. In the mono-tube design, a piston is located within a pressure tube and is typically connected to the sprung mass of the vehicle through a piston rod. The pressure tube is typically connected to the unsprung mass of the vehicle. The piston divides the pressure tube into an upper working chamber and a lower working chamber. The piston includes compression valving which limits the flow of damping fluid from the lower working chamber to the upper working chamber during a compression stroke and rebound valving which limits the flow of damping fluid from the upper working chamber to the lower working chamber during a rebound or extension stroke. Because the compression valving and the rebound valving have the ability to limit the flow of damping fluid, the shock absorber is able to produce a damping force which counteracts the vibrations which would otherwise be transmitted from the unsprung mass to the sprung mass.

In a dual-tube shock absorber, a fluid reservoir is defined between the pressure tube and a reservoir tube which is positioned around the pressure tube. The reserve tube is typically connected to the unsprung mass of the vehicle. A base valve assembly is located between the lower working chamber and the fluid reservoir to control the flow of dampening fluid. The compression valving of the piston is moved to the base valve assembly and is replaced by a compression check valve assembly. In addition to the compression valving, the base valve assembly includes a rebound check valve assembly. The compression valving of the base valve assembly produces the damping force during a compression stroke, and the rebound valving of the piston produces the damping force during a rebound or extension stroke. Both the compression and rebound check valve assemblies permit fluid flow in one direction, but prohibit fluid flow in an opposite direction; however, they are designed such that they do not generate a damping force.

SUMMARY

The present disclosure is directed to an inverted shock absorber which uses air as the damping medium. In the inverted shock absorber, the piston rod is attached to the unsprung mass of the vehicle and the pressure tube of the mono-tube design or the reserve tube of the dual-tube design is attached to the sprung mass of the vehicle. The shock absorber of the present disclosure also includes a hydraulic stop which cushions the shock absorber during a full compression stroke.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 5a and 5b are schematic views illustrating the operation of a hydraulic stop in accordance with another embodiment of the present disclosure; and FIGS. 6a and 6b are schematic views illustrating the operation of a hydraulic stop in accordance with another embodiment of the present disclosure.

DETAILED DESCRIPTION

The following description is merely exemplary in nature and is not intended to limit the present disclosure, application, or uses.

Figure 1:
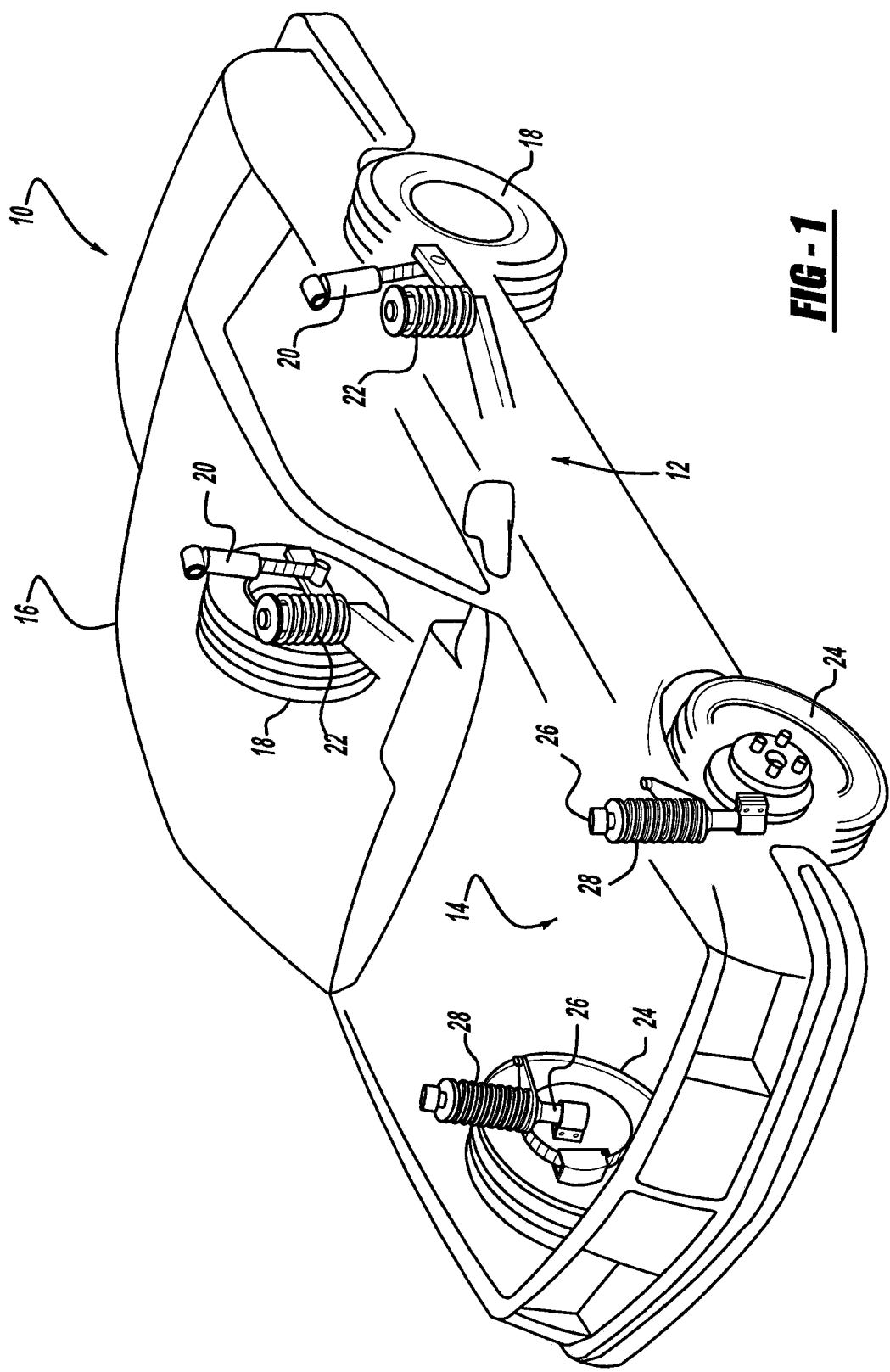
FIG. 1 is a schematic representation of a typical automobile which incorporates a shock absorber in accordance with the present disclosure.

Referring now to the drawings in which like reference numerals designate like or corresponding parts throughout the several views, there is shown in FIG. 1 a vehicle which includes a suspension system incorporating shock absorbers in accordance with the present disclosure and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18 of vehicle 10. The rear axle assembly is operatively connected to body 16 by means of a pair of shock absorbers 20 and a pair of helical coil springs 22. Similarly, front suspension 14 includes a transversely extending front axle assembly (not shown) to operatively support a pair of front wheels 24 of vehicle 10. The front axle assembly is operatively connected to body 16 by means of a second pair of shock absorbers 26 and by a pair of helical coil springs 28. Shock absorbers 20 and 26 serve to dampen the relative motion of the unsprung mass (i.e., front and rear suspensions 12 and 14, respectively) and the sprung mass (i.e., body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
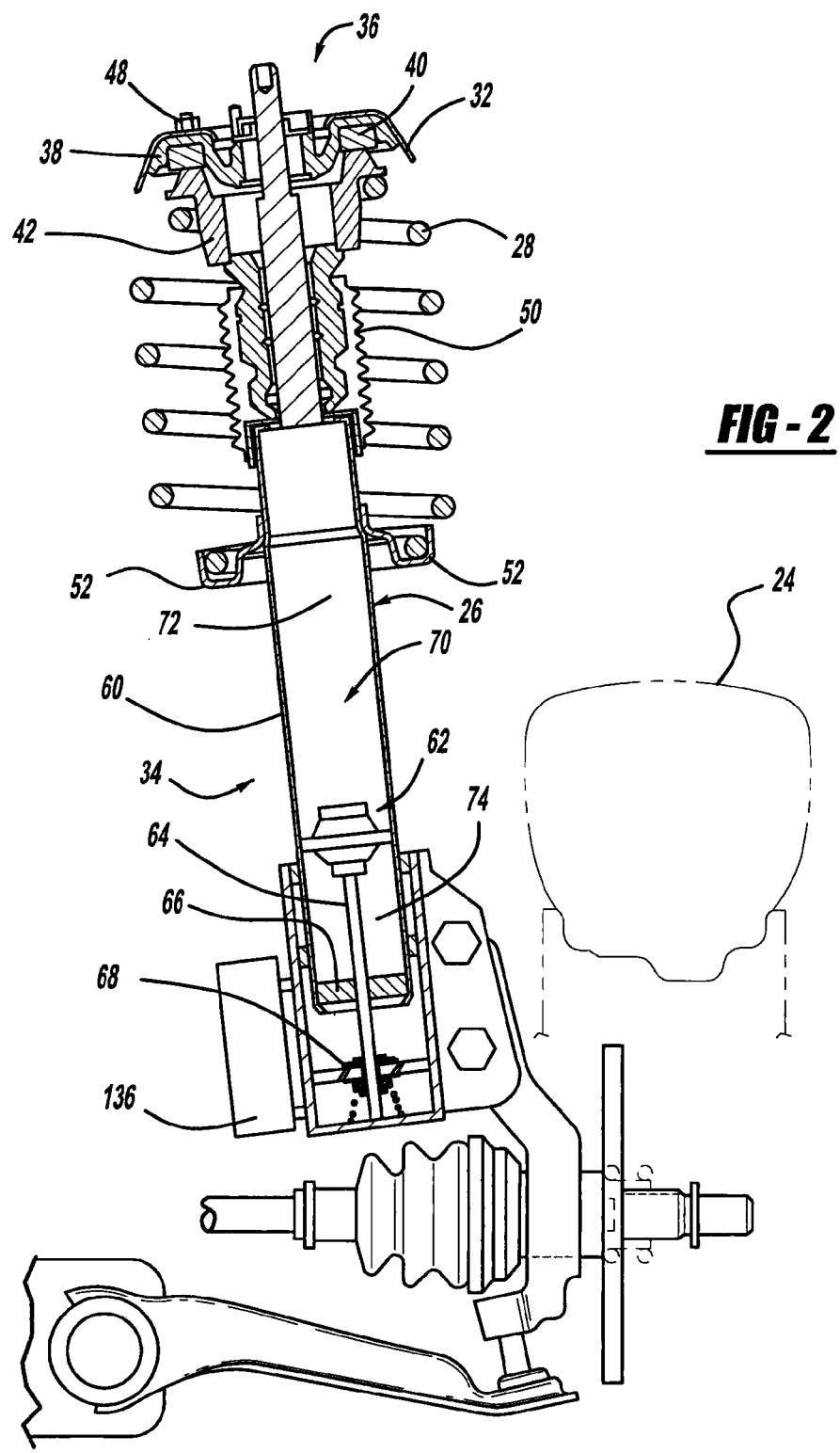
FIG. 2 is a side view of one of the front suspension units that incorporate the strut assembly in accordance with the present disclosure.

Referring now to FIG. 2, the front wheel assembly for vehicle 10 is illustrated in greater detail. Body 16 defines a shock tower 32 comprising sheet metal of vehicle 10 within which a strut assembly 34 is located which includes a telescoping device in the form of shock absorber 26, coil spring 28 and a top mount assembly 36. Strut assembly 34 including shock absorber 26, coil spring 28 and top mount assembly 36 comprises a top mount 38, a bearing assembly 40 and an upper spring seat 42. Top mount 38 comprises an integral molded body and a rigid body member typically made of stamped steel. Top mount assembly 36 is mounted to shock tower 32 of body 16 by bolts 48. Bearing assembly 40 is friction fit within the molded body of top mount 38 to be seated in top mount 38 so that one side of bearing assembly 40 is fixed relative to top mount 38 and shock tower 32. The second side of bearing assembly 40 freely rotates with respect to the first side of bearing assembly 40, top mount 38 and shock tower 32.

The free rotating side of bearing assembly 40 carries upper spring seat 42 that is clearance fit to the outer diameter of bearing assembly 40. A plastic dirt shield 50 covers the telescoping portion of shock absorber 26 to protect shock absorber 26 from dirt water and other contamination.

A lower spring seat 52 is attached to shock absorber 26 and coil spring 28 is disposed between upper spring seat 42 and lower spring seat 52 to isolate body 16 from front suspension 14. Shock absorber 26 comprises a pressure tube 60, a piston assembly 62, a piston rod 64, a rod guide assembly 66 and a hydraulic stop assembly 68.

Figure 3:
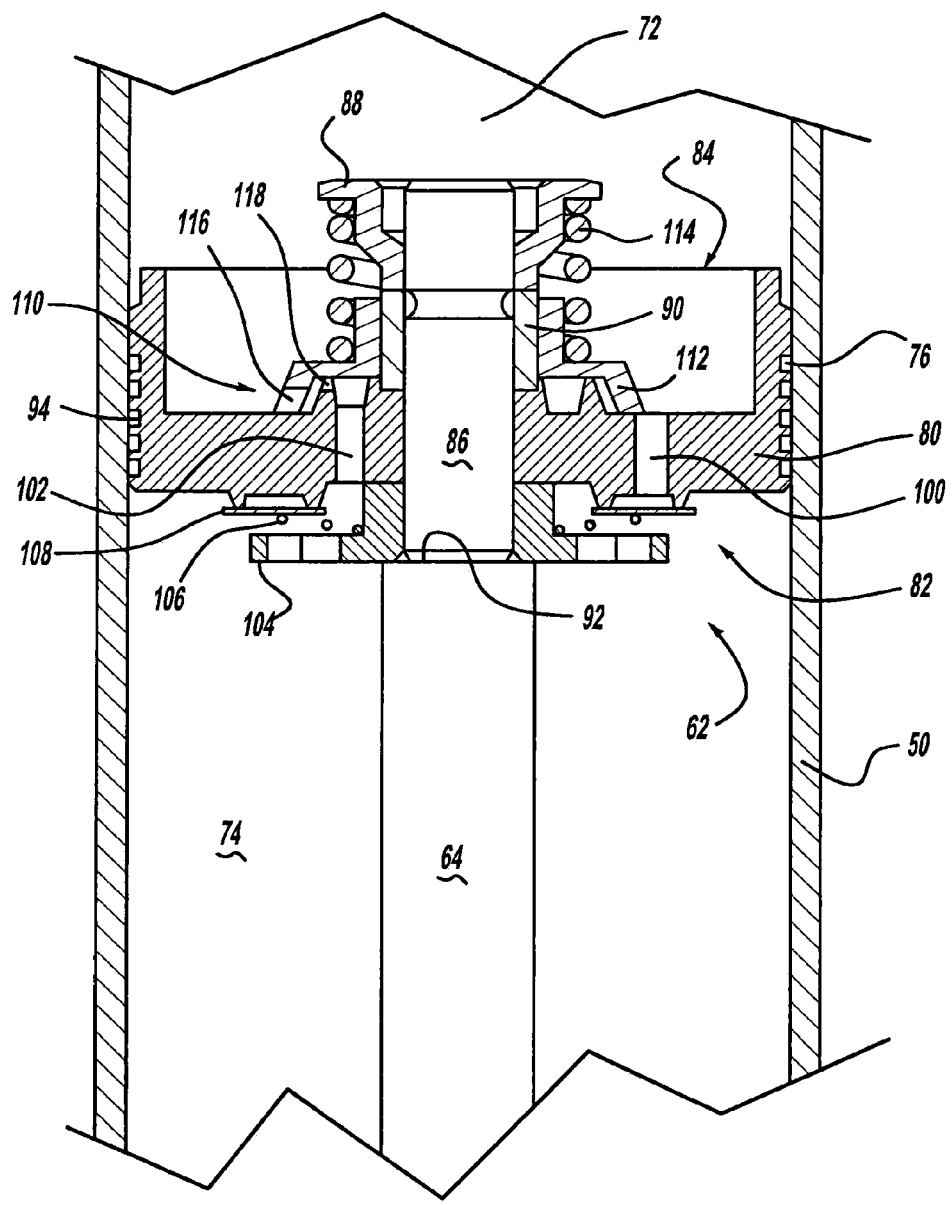
FIG. 3 is an enlarged view of the piston assembly illustrated in FIG. 2.

Referring to FIGS. 2 and 3, pressure tube 60 defines a working chamber 70 which is filled with gas, preferably air, at a specified pressure to act as the damping medium. Piston assembly 62 is slidably disposed within working chamber 70 and divides working chamber 70 into an upper working chamber 72 and a lower working chamber 74. A seal 76 is disposed between piston assembly 62 and pressure tube 60 to permit sliding movement of pressure tube 60 with respect to piston assembly 62 without generating undue frictional forces as well as to seal upper working chamber 72 for lower working chamber 74. Piston rod 64 is attached to piston assembly 62 and it extends through lower working chamber 74 and through guide assembly 66 which closes the lower end of pressure tube 60. The end of piston rod 64 opposite to piston assembly 62 is adapted to be secured to the unsprung portion of vehicle 10 using hydraulic stop assembly 68. The end of pressure tube 60 opposite to rod guide assembly 66 is adapted to be secured to top mount assembly 36 and the sprung portion of vehicle 10.

Referring now to FIG. 3, piston assembly 62 comprises piston body 80, a compression valve assembly 82 and a rebound or extension valve assembly 84. Piston rod 64 defines a reduced diameter section 86 onto which compression valve assembly 82, piston body 80 and extension valve assembly 84 are located. A nut 88 and a spacer 90 secure piston assembly 62 onto section 86 of piston rod 64 with compression valve assembly 82 abutting a shoulder 92 located on piston rod 64, piston body 80 abutting compression valve assembly 82, spacer 90 with nut 88 abutting piston body 80 and extension valve assembly 84 being disposed between piston body 80 and nut 88.

Seal 76 is an annular seal located between piston body 80 and pressure tube 60. Seal 76 is held in position by a plurality of grooves 94 formed in piston body 80. Seal 76 permits sliding movement of pressure tube 60 with respect to piston body 80 without generating undue frictional forces as well as providing the seal between upper working chamber 72 and lower working chamber 74. This dual roll played by seal 76 is extremely important for pneumatic shock absorber 26 due to high pressures generated in working chambers 72 and 74 and the continued need for limiting the sliding forces generated between piston assembly 62 and pressure tube 60.

Piston body 80 defines a plurality of compression passages 100 and a plurality of extension passages 102. During a compression movement of shock absorber 26, gas flows between upper working chamber 72 and lower working chamber 74 through compression passages 100 as described below. During an extension movement of shock absorber 26, gas flows between lower working chamber 74 and upper working chamber 72 through extension passages 102 as described below.

Compression valve assembly 82 comprises a stop 104, a valve spring 106 and a valve plate 108. Valve plate 108 is biased against piston body 80 by valve spring 106 which reacts against stop 104 to normally close the plurality of compression passages 100. During a compression stroke of shock absorber 26, the gas in upper working chamber 72 is compressed including the gas within the plurality of compression passage 100. Extension valve assembly 84 includes a constantly open flow path 110 which will allow for a limited flow of gas between upper working chamber 72 and lower working chamber 74 as the gas in upper working chamber 72 is compressed. The compressed gas in compression passages 100 exerts a force on valve plate 108 which will remain seated closing compression passages 100 until the force created by the gas pressure overcomes the biasing of valve spring 106 unseating valve plate 108 from piston body 80 allowing additional gas to flow from upper working chamber 72 to lower working chamber 74 through compression passages 100. Thus, a two step damping force is created during a compression stroke. The initial movement and/or relatively small movements of pressure tube 60 will cause the gas to flow only through flow path 110 and extension passages 102. When the movement exceeds a predetermined speed or value and/or during relatively large movements of pressure tube 60, compression valve assembly 82 will open allowing gas flow through both passages 100 and 102 through flow path 110. This two step damping force switches from a relatively firm damping to a relatively soft damping.

Extension valve assembly 84 comprises a sliding valve seat 112 and a valve spring 114. Valve seat 112 is biased against piston body 80 by valve spring 114 which reacts against retaining nut 88. Valve seat 112 defines one or more passages 116 which in combination with one or more passages 118 defined by piston body 80 create flow path 110. During an extension stroke of shock absorber 26, the gas in lower working chamber 74 is compressed including the gas within the plurality of extension passages 102. The plurality of extension passages 102 and flow path 110 define a route for the gas between lower working chamber 74 and upper working chamber 72 which is always open and thus will allow a limited flow of the gas between lower working chamber 74 and upper working chamber 72 as the gas in lower working chamber 74 is compressed. The compressed gas in extension passages 102 exerts a force on valve seat 112 which will remain seated closing extension passages 102 (other than flow path 110) until the force created by the gas pressure overcomes the biasing load of valve seat 112 unseating valve seat 112 from piston body 80 by sliding seat valve 112 down along spacer 90 allowing additional gas to flow from lower working chamber 74 to upper working chamber 72 through extension passages 102. Thus a two step damping force is created during an extension stroke. The initial movement and/or relatively small movements of pressure tube 60 will cause the gas to flow only through extension passages 102 through flow path 110. When the extension movement exceeds a predetermined speed or value and/or during large movements of pressure tube 60, extension valve assembly 84 will open allowing gas to flow through extension passages 102 thus providing a blow off feature. The two step damping force switches from a relatively firm damping to a relatively soft damping and/or providing a blow off feature.

Gas filled shock absorber 26 described above provides a frequency dependant damper which can be tuned to specific performance requirements for specific applications. During compression and extension movements of a prior art liquid filled shock absorber, the liquid moves from either the lower working chamber to the upper working chamber or the upper working chamber to the lower working chamber. This provides frequency vs. dissipation response curves which continue to rise at an ever increasing rate as the frequency of the damped vibration increases leading to an exponential shape curve at higher frequencies.

Referring now to FIGS. 2-4b, hydraulic stop assembly 68 comprises a pressure tube 120, a tube guide assembly 122, a piston assembly 124 and a reservoir assembly 126. Piston rod 64 is attached to the bottom of pressure tube 120 and extends into a working chamber 128 defined by pressure tube 120.

Pressure tube 60 extends into working chamber 128 and is guided for axial movement with respect to piston assembly 62 by tube guide assembly 122. Tube guide assembly 122 comprises a pair of bearings 130 which guide the movement of pressure tube 60 and a sealing member 132 which seals working chamber 128 from the outside environment. Working chamber 128 is filled with hydraulic fluid and is in communication with reservoir assembly 126 through a connecting passage 134.

Reservoir assembly comprises a reservoir tube 136 and a floating piston 140. A seal 142 seals the interface between piston 140 and reservoir tube 136. Piston 140 divides reservoir tube 136 into a hydraulic fluid chamber 144 and a pneumatic chamber 146. Hydraulic chamber 144 is in communication with working chamber 128 through connecting passage 134.

Piston assembly 124 comprises a piston body 150, a compression valve assembly 152, a rebound valve assembly 154, a return spring 156 and a retainer 158. Retainer 158 slidingly engages piston rod 64 and it secures compression valve assembly 154 to piston body 150. Piston body 150 defines a plurality of compression passages 160 and a plurality of rebound passages 162. Piston body 150 divides working chamber 128 into a lower working chamber 164 and an upper working chamber 166.

Compression valve assembly 152 comprises one or more valve discs 168 that are positioned to close the plurality of compression passages 160. During a compression or downward stroke of piston body 150, fluid pressure in lower working chamber 164 will increase and the fluid pressure reacting against valve discs 168 will deflect and fluid will flow from lower working chamber 164 to upper working chamber 166 through compression passages 160. The fluid flowing into upper working chamber 166 will flow through passage 134 and into chamber 144 moving floating piston 140.

Rebound valve assembly 154 comprises one or more valve discs 170 that are positioned to close the plurality of rebound passages 162. During a rebound or upward stroke of piston body 150, fluid pressure in upper working chamber 164 will increase and the fluid pressure reacting against valve discs 170 will deflect and fluid will flow from below upper working chamber 166 to lower working chamber 164 through rebound passages 162. The fluid flowing out of the upper working chamber 166 will be replaced by fluid flowing through passage 134 from chamber 144 due to the pressure within pneumatic chamber 146. Upward motion of piston body 150 is caused by return spring 156.

Figure 4A:
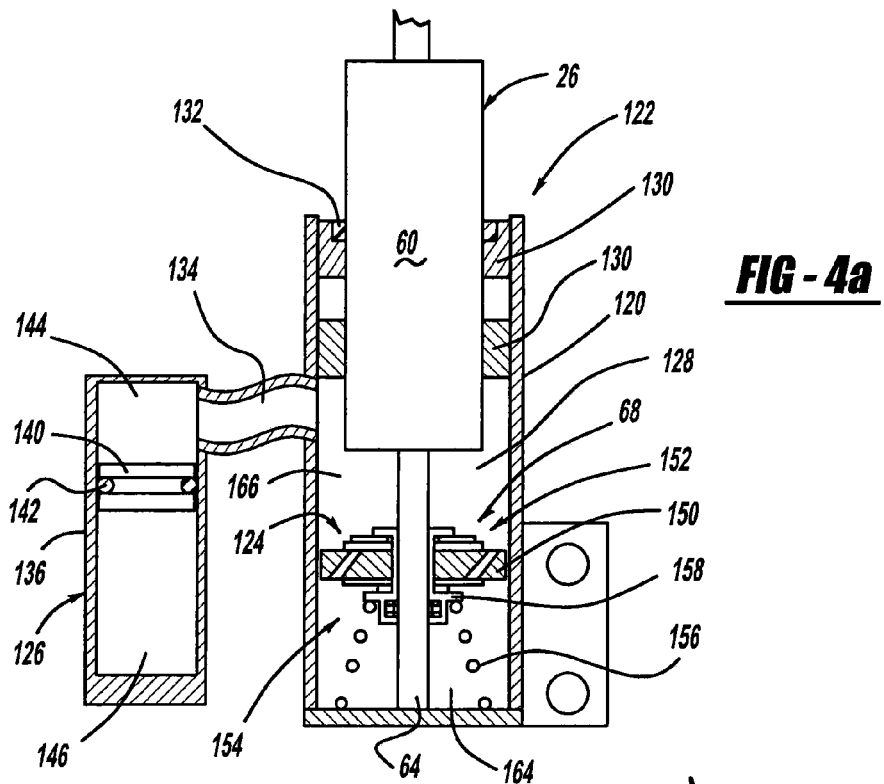
FIGS. 4a and 4b are schematic views illustrating the portion of the hydraulic stop in accordance with the present disclosure.

FIG. 4a illustrates the normal stroking for shock absorber 26. As pressure tube 60 moves into and out of pressure tube 120, hydraulic fluid in upper working chamber 166 will move into and out of chamber 144 through passage 134. The movement of hydraulic fluid into and out of chamber 144 will cause the movement of floating piston 140 in reservoir tube 136 and the subsequent compressing and decompressing of pneumatic chamber 146. The fluid pressure required to move floating piston 140 is less than the fluid pressure required to open hydraulic stop assembly 68.

Figure 4B:
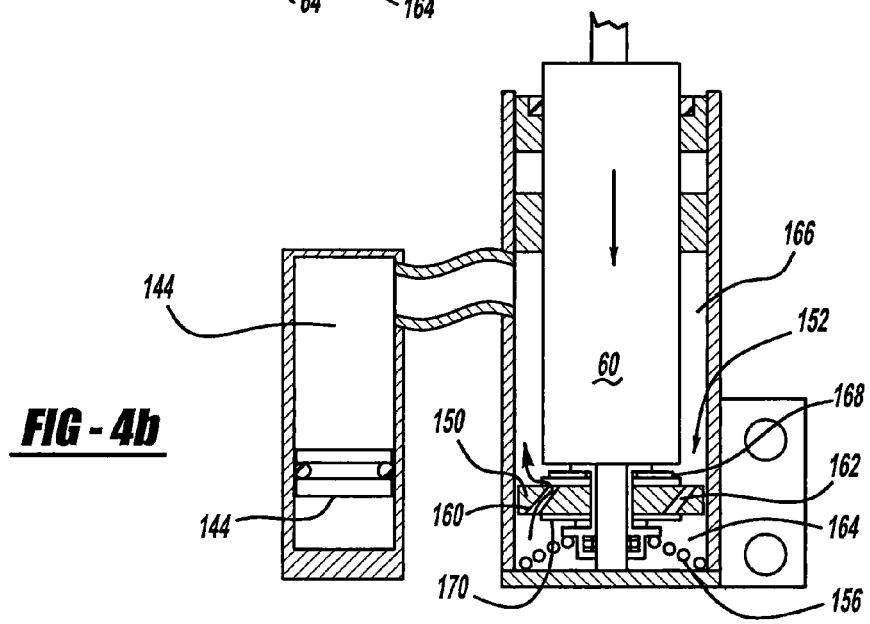

FIG. 4b illustrates shock absorber 26 during a near full compression stroke where hydraulic stop assembly 68 begins to function. Downward or compression movement of pressure tube 60 causes pressure tube 60 to engage hydraulic stop assembly 68 and cause downward or compression movement of piston body 150. Fluid pressure in lower working chamber 164 will deflect valve discs 168 causing fluid to flow from lower working chamber 164 to upper working chamber 166 and into chamber 144 through passage 134. This movement of fluid through compression passage 160 created a damping load which will dampen the further compression movement of pressure tube 60.

When pressure tube 60 begins an extension or rebound stroke, return spring 156 will move piston body 150 upward or in an extension stroke lowering the fluid pressure within lower working chamber 164 and increasing the fluid pressure within upper working chamber 166. Valve discs 170 will deflect due to the fluid pressure difference causing fluid flow from upper working chamber 166 through rebound passages 162 and into lower working chamber 164. The fluid from chamber 144 will equalize the fluid within upper working chamber 166 due to the pneumatic pressure within pneumatic chamber 146. The fluid pressure required to deflect valve discs 170 is relatively low such that the upward movement of piston body 150 caused by return spring 156 will deflect valve discs 170 before movement of piston 140 in chamber 144.

FIGS. 5a and 5b illustrate a hydraulic stop assembly 268 in accordance with another embodiment of the present disclosure. In this embodiment, return spring 156 is eliminated. A pressure tube 220 replaces pressure tube 120 and piston assembly 224 is attached to pressure tube 60. Piston assembly 224 is the same as piston assembly 124 except for the elimination of return spring 156. Thus, the above discussion regarding piston body 150, compression valve assembly 152, rebound valve assembly 154 and retainer 158 apply to this embodiment also.

FIG. 5a illustrates the normal stroking for shock absorber 26. As pressure tube 60 moves into and out of pressure tube 220, hydraulic fluid in upper working chamber 166 will move into and out of chamber 144 through passage 134. The movement of hydraulic fluid into and out of chamber 144 will cause the movement of floating piston 140 in reservoir tube 136 and the subsequent compressing and decompressing of pneumatic chamber 146. During this movement of pressure tube 60, the fluid in upper working chamber 166 will flow around piston assembly 224 due to the clearance provided between piston body 150 of piston assembly 224 and pressure tube 220 as illustrated in FIG. 5a.

FIG. 5b illustrates shock absorber 26 during a near full compression stroke where hydraulic stop assembly 268 begins to function. Downward or compression movement of pressure tube 60 causes piston assembly 224 to enter a reduced internal diameter area 280 of pressure tube 220. A ramped section 282 smoothes the transition between the larger internal diameter of pressure tube 220 and the reduced internal diameter area 280 to provide progressive force build-up. When piston assembly 224 enters reduced internal diameter area 280, fluid flow around the exterior of piston body 150 is restricted. As a result, fluid pressure within reduced internal diameter area 280 below piston body 150 will be compressed creating fluid pressure that will deflect valve discs 168 causing fluid to flow from below piston body 150 to upper working chamber 166 and into chamber 144 through passage 134. This movement of fluid through compression passages 160 creates a damping load which will dampen the further compression movement of pressure tube 60.

When pressure tube 60 begins an extension or rebound stroke, piston body 150 will move upward reducing the fluid pressure within reduced internal diameter area 280 and compressing the fluid in upper working chamber 166. Due to this fluid pressure difference valve discs 170 will deflect due to the fluid pressure within upper working chamber 166 causing fluid flow from upper working chamber 166 into reduced internal diameter area 280. The fluid from chamber 144 will equalize the fluid flow within upper working chamber 166 due to the pneumatic pressure within the pneumatic chamber 146. The fluid pressure required to deflect valve discs 170 is relatively low such that the upward movement of piston body 150 will deflect valve discs 170 before movement of piston 140 in chamber 144.

FIGS. 6a and 6b illustrate a hydraulic stop assembly 368 in accordance with another embodiment of the present disclosure. In this embodiment, piston assembly 124 has been replaced by piston assembly 424. Piston assembly 424 is disposed within hydraulic chamber 144 and is attached to reservoir tube 136 as is illustrated in FIGS. 6a and 6b.

Piston assembly 124 comprises a piston body 450, a compression valve assembly 452, an inertia valve assembly 454 and a retainer 458. Piston body 450 divides hydraulic chamber 144 into a lower working chamber 464 and an upper working chamber 466. Piston body 450 is secured to reservoir tube 136 and it defines a plurality of compression passages 460.

Compression valve assembly 452 comprises one or more valve discs 468 that are positioned to close the plurality of compression passages 460. During a downward or compression movement of pressure tube 60, fluid pressure within working chamber 128 will increase, causing an increase in the fluid pressure within lower working chamber 464. When inertia valve assembly 454 is in an open position as illustrates in FIG. 6a, fluid flows from lower working chamber 464 to upper working chamber 466 through inertia valve assembly 454. When inertia valve assembly 454 is in a closed position as illustrated in FIG. 6b, the fluid pressure within lower working chamber 464 will react against valve discs 468 to deflect valve discs 468 and fluid will flow from lower working chamber 464 to upper working chamber 466 through compression passages 460. The fluid flowing into upper working chamber 466 will then move floating piston 140.

Inertia valve assembly 454 comprises a valve body 470, a specified mass 472 and a spring 474. Valve body 470 slidingly engages piston body 450 and valve body 470 defines a flow passage 476 which extends between lower working chamber 464 and upper working chamber 466 when inertia valve assembly 454 is in its open position as illustrated in FIG. 6a. Specified mass 472 is attached to or integral with valve body 470 and is disposed within upper working chamber 466. Spring 474 biases valve body 470 and specified mass 472 upward into an open position for inertia valve assembly 454 as illustrated in FIG. 6a. In this open position, fluid flows freely between upper and lower working chamber 466 and 464. When specified mass 472 is subjected to a vertical impact, specified mass 472 and valve body 470 move downward closing flow passage 476 as illustrated in FIG. 6b.

FIG. 6a illustrates the normal stroking for shock absorber 26. As pressure tube 60 moves into and out of pressure tube 120, hydraulic fluid will move into and out of chamber 144 through passage 134. The movement of hydraulic fluid into and out of chamber 144 will cause the movement of floating piston 140 in reservoir tube 136 due to fluid passage 476 being open and the subsequent compressing and decompressing of pneumatic chamber 146.

FIG. 4b illustrates shock absorber 26 after being subjected to a vertical impact. Due to the vertical impact, specified mass 472 and valve body 470 move downward closing fluid passage 476 eliminating the flow of fluid through inertia valve assembly 454. Downward or compression movement of pressure tube 60 increases the fluid pressure within working chamber 128 which increases the fluid pressure within lower working chamber 464. Fluid pressure within lower working chamber 464 will deflect valve discs 468 causing fluid to flow from lower working chamber 464 to upper working chamber 466. This movement of fluid through compression passages 460 creates a damping load which will dampen the compression movement of pressure tube 60 and the subsequent movement of floating piston 140.

When pressure tube 60 begins an extension or rebound stroke, spring 474 will return specified mass 472 and valve body 470 to their open position as illustrated in FIG. 6a causing fluid to flow from upper working chamber 466 to lower working chamber 464 through passage 134 and into working chamber 128.

While not specifically illustrated, inertia valve assembly 454 can be combined with hydraulic stop assembly 68 or 268.

What is claimed is:
1. A shock absorber comprising:
a first pressure tube defining a first working chamber;
a first piston slidably disposed within said first pressure tube, said first piston dividing said first working chamber into an upper working chamber and a lower working chamber;
a second pressure tube surrounding said first pressure tube to define a second working chamber, said second working chamber not communicating with said first working chamber;
a second piston in hydraulic communication with said second working chamber, said second piston defining a plurality of passages, each of said plurality of passages extending through said second piston;
a piston rod attached to said first piston and fixably secured to a first end of said second pressure tube, said piston rod extending through one of said upper and lower working chambers;
a compression hydraulic stop creating a damping load during a compression movement of said shock absorber; wherein
said first piston is movable between a fully compressed position where said shock absorber is at a minimum length and a fully extended position where said shock absorber is at a maximum length; and
said compression hydraulic stop creates said damping load only at a position immediately adjacent said fully compressed position.

2. The shock absorber of claim 1, wherein said compression hydraulic stop is disposed outside of said first pressure tube.

3. The shock absorber of claim 1, wherein said second piston is disposed within said second working chamber.

4. The shock absorber of claim 3, wherein said second piston is attached to said second pressure tube.

5. The shock absorber of claim 3, wherein said second piston is attached to said first pressure tube.

6. The shock absorber of claim 1, wherein said second piston is attached to said second pressure tube.

7. The shock absorber of claim 1, wherein said second piston is attached to said first pressure tube.

8. The shock absorber of claim 1, wherein said second pressure tube defines a reduced diameter section within said second working chamber.

9. The shock absorber of claim 8, wherein said second piston is attached to said first pressure tube.

10. The shock absorber of claim 1, wherein said compression hydraulic stop further comprise a reservoir tube defining a hydraulic fluid chamber in communication with said second working chamber.

11. The shock absorber of claim 10, wherein said second piston is disposed within said hydraulic fluid chamber.

12. The shock absorber of claim 10, wherein said second piston is disposed within said second working chamber.

13. The shock absorber of claim 10, wherein said second piston is attached to said second pressure tube.

14. The shock absorber of claim 10, wherein said compression hydraulic stop further comprises a floating piston, said floating piston defining said hydraulic fluid chamber and a pneumatic chamber.

15. The shock absorber of claim 14, wherein said second piston is disposed within said hydraulic fluid chamber.

16. The shock absorber of claim 15, wherein said second piston is disposed within said second working chamber.

17. The shock absorber of claim 15, wherein said second piston is attached to said second pressure tube.

18. The shock absorber according to claim 1, further comprising a first valve assembly attached to said second piston, said first valve assembly controlling fluid flow through a first one of said plurality of passages.

19. The shock absorber according to claim 18, further comprising a second valve assembly attached to said second piston, said second valve assembly controlling fluid flow through a second one of said plurality of passages.

20. A shock absorber comprising:
a first pressure tube defining a first working chamber;
a first piston slidably disposed within said first pressure tube, said first piston dividing said first working chamber into an upper working chamber and a lower working chamber;
a second pressure tube surrounding said first pressure tube to define a second working chamber, said second working chamber not communicating with said first working chamber;
a second piston in hydraulic communication with said second working chamber;
a piston rod attached to said first piston and fixably secured to a first end of said second pressure tube, said piston rod extending through one of said upper and lower working chambers;
a compression hydraulic stop creating a damping load during a compression movement of said shock absorber; and
a tube guide assembly fixably secured to a second end of said second pressure tube opposite to said first end, said tube guide assembly sealing said second working chamber from an outside environment; wherein
said first piston is movable between a fully compressed position where said shock absorber is at a minimum length and a fully extended position where said shock absorber is at a maximum length; and
said compression hydraulic stop creates said damping load only at a position immediately adjacent said fully compressed position.

21. The shock absorber according to claim 20, wherein the tube guide assembly includes a bearing directly engaging said first pressure tube and said second pressure tube and a seal directly engaging said first pressure tube.

22. A shock absorber comprising:
a first pressure tube defining a first working chamber;
a first piston slidably disposed within said first pressure tube, said first piston dividing said first working chamber into an upper working chamber and a lower working chamber;
a second pressure tube surrounding said first pressure tube to define a second working chamber, said second working chamber not communicating with said first working chamber;
a second piston in hydraulic communication with said second working chamber;
a piston rod attached to said first piston and fixably secured to a first end of said second pressure tube, said piston rod extending through one of said upper and lower working chambers;
a compression hydraulic stop cushioning a full compression movement of said shock absorber;
wherein said second piston does not directly contact an outer cylinder surface of said first pressure tube.

* * * * *